US010238132B2

(12) United States Patent
Dryzun

(10) Patent No.: US 10,238,132 B2
(45) Date of Patent: Mar. 26, 2019

(54) BEVERAGE COOLING AND CLEANING SYSTEMS

(71) Applicant: Nathan Dryzun, Southbank Victoria (AU)

(72) Inventor: Nathan Dryzun, Southbank Victoria (AU)

(73) Assignee: CUB PTY LTD, Southbank Victoria (AU)

( * ) Notice: Subject to any disclaimer, the term of this patent is extended or adjusted under 35 U.S.C. 154(b) by 1225 days.

(21) Appl. No.: 13/864,579

(22) Filed: Apr. 17, 2013

(65) Prior Publication Data

US 2013/0276469 A1 Oct. 24, 2013

(30) Foreign Application Priority Data

Apr. 18, 2012 (AU) ................................ 2012901528

(51) Int. Cl.
*A23L 3/36* (2006.01)
*F25B 49/02* (2006.01)
(Continued)

(52) U.S. Cl.
CPC .............. *A23L 3/36* (2013.01); *B67D 1/0859* (2013.01); *F25B 49/02* (2013.01); *F25D 31/003* (2013.01); *F25B 2600/02* (2013.01); *F25B 2600/111* (2013.01); *F25B 2600/2513* (2013.01); *F25B 2700/21151* (2013.01); *F25B 2700/21152* (2013.01); *F25B 2700/21163* (2013.01); *F25D 2700/14* (2013.01); *F25D 2700/16* (2013.01)

(58) Field of Classification Search
CPC .. B67D 1/0857; B67D 1/0858; B67D 1/0859; B67D 1/0861; B67D 1/0864; B67D 1/0865; B67D 1/0867; F25D 31/002; F25D 31/003; F25B 25/005
See application file for complete search history.

(56) References Cited

U.S. PATENT DOCUMENTS 4,706,467 A * 11/1987 Thorsen .................. F25D 21/02
62/139
5,279,446 A * 1/1994 Cook ................ G05D 23/1919
222/146.6
(Continued)

*Primary Examiner* — Jonathan Bradford
(74) *Attorney, Agent, or Firm* — Finnegan, Henderson, Farabow, Garrett & Dunner, LLP

(57) ABSTRACT

A primary beverage cooling circuit for refrigerating a fluid used in a secondary beverage cooling circuit cools beverage in a beverage conduit by pumping the fluid through a heat exchange conduit adjacent the beverage conduit to transfer heat therebetween. The primary beverage cooling circuit includes a refrigerant circuit containing a refrigerant circulating through a heat exchanger in heat transfer communication with the fluid to cool the fluid, a variable displacement compressor for circulating the refrigerant through the refrigerant circuit, a cooling device for cooling the refrigerant, and a valve for controlling the volume of fluid into the heat exchanger. The primary beverage cooling circuit further includes a controller for controlling the operation of the compressor and/or the cooling device and/or the valve based on one or more measurements from temperature and/or pressure sensors in the refrigerant circuit to maintain a temperature of the fluid and/or refrigerant about a set-point temperature.

25 Claims, 7 Drawing Sheets

(51) Int. Cl.
*B67D 1/08* (2006.01)
*F25D 31/00* (2006.01)

(56) References Cited

U.S. PATENT DOCUMENTS

| | | | | | |
|---|---|---|---|---|---|
| 5,363,671 | A * | 11/1994 | Forsythe | B67D 1/0864 222/146.6 |
| 6,148,634 | A * | 11/2000 | Sherwood | C09K 5/041 62/114 |
| 6,324,850 | B1 * | 12/2001 | Davis | B67D 1/0054 62/3.64 |
| 2004/0216474 | A1 * | 11/2004 | Jablonski | A23G 9/045 62/137 |
| 2010/0326106 | A1 * | 12/2010 | Hsu | F25B 49/027 62/203 |

* cited by examiner

BEVERAGE COOLING AND CLEANING SYSTEMS

FIELD OF THE INVENTION

The present invention relates to a beverage cooling system, beverage cooling circuits and a beverage conduit cleaning system.

BACKGROUND

In the beverage serving industry, beverages are commonly dispensed from a tap that is connected to a bulk receptacle (eg. a keg) through beverage lines or conduits.

This is a common arrangement, for example, in serving beer at public bars.

In order to serve the beverage at an appropriate temperature, the beverage lines or conduits can be chilled or cooled. In some instances, this involves passing the beverage lines through a cold bath. However, the transition of the lines from the bath to the tap allows the beverage to absorb heat from the surrounding atmosphere which may lead to the beverage being served warmer than desired.

To counter this issue heat exchange conduits are used to extract heat from the beverage conduits. The heat exchange lines run in parallel with the beverage lines, and contain a cooled fluid. Thus the temperature of the heat exchange conduit is, at least initially, lower than that of the beverage lines to enable heat to be extracted from the latter to the former.

However, since it is more energy efficient to maintain the temperature of a volume of fluid in a bath rather than in individual conduits, the heat exchange lines usually connect to a cooling or refrigeration system that includes a tank or bath of cooled fluid. The cooled fluid is then metered into the heat exchange lines as needs be.

Such tanks are stored in coolrooms for protection from ambient heat. Therefore, such tanks occupy space in the coolroom that might otherwise be used to chill beverages and/or food. Since positioning tanks outside the coolroom causes the fluid to absorb heat from the atmosphere through the body of the tank, positioning such tanks outside of coolrooms is considered undesirable.

In addition, the fluid in the tank is cooled using a refrigerant circuit. Since the refrigerant circuit includes a condenser, and since the condenser is designed to give off heat, the condenser must be separated from the tank and placed outside the coolroom (i.e. the system is a "split" system). Such a system is undesirable since space must then be dedicated to the condenser alone, and repositioning the split system is inconvenient.

A further drawback inherent in such systems is that the beverage lines are intentionally cold, which makes them difficult to clean. Detergents that are active at lower temperatures have been developed, however, these are not always effective.

Poor cleaning of the beverage lines leads to a build up of biofilm—an organic film that forms on the inside of the beverage lines and can corrupt the taste of the beverage or make it unpalatable to drink.

A common technique of cleaning beverage lines is to raise the temperature of cleaning solution in the beverage lines by switching off the beverage cooling system and allowing it to absorb atmospheric heat for an extended period of time so that the fluid warms up to just below ambient temperature, which then allows the cleaning solution to warm up. This has the effect of making biofilm more easily dislodged, enabling the biofilm to be flushed from the lines during the beverage lines' cleaning process.

A drawback of such a method of cleaning is that it is time consuming to wait for the temperature to rise sufficiently to ensure proper cleaning, with a consequent reduction in the time during which beverages can be dispensed for consumption. Also, since the entire body of fluid increases in temperature this leads to a significant expenditure of time and energy when cooling the fluid after cleaning.

A system or circuit is therefore desired that improves the efficiency of the cleaning process and/or improves the efficiency of cooling beverage.

SUMMARY OF THE INVENTION

In accordance with the present invention, there is provided a primary beverage cooling circuit for refrigerating a fluid used in a secondary beverage cooling circuit that cools beverage in a beverage conduit by pumping the fluid through a heat exchange conduit adjacent the beverage conduit to transfer heat therebetween, the primary beverage cooling circuit comprising:

- a refrigerant circuit containing a refrigerant circulating through:
  - a heat exchanger in heat transfer communication with the fluid to cool the fluid;
  - a variable displacement compressor for circulating the refrigerant through the refrigerant circuit;
  - a cooling device for cooling the refrigerant; and
  - a valve for controlling the volume of fluid into the heat exchanger;
- the primary beverage cooling circuit further comprising a controller for controlling the operation of the compressor, the cooling device and/or the valve based on one or more measurements from temperature and/or pressure sensors in the refrigerant circuit to thereby operate the system on an efficient basis.

In accordance with the present invention there is further provided a beverage cooling system comprising the primary beverage cooling circuit described above, and a secondary beverage cooling circuit containing fluid that cools beverage in a beverage conduit, the secondary cooling circuit comprising a heat exchange conduit positioned to transfer heat from the beverage conduit and a pump to pump the fluid through the heat exchange conduit, wherein the secondary cooling circuit is positioned in heat exchange with the primary cooling circuit for cooling the fluid.

In accordance with the present invention there is still further provided a beverage conduit cleaning system comprising:

- a heat exchange circuit including a heat exchange conduit containing a fluid, and a beverage conduit containing a cleaning solution located near or adjacent the heat exchange conduit to enable heat transfer therebetween;
- the heat exchange circuit comprising a pump to pump the fluid through the heat exchange conduit, and a heater to heat the fluid in the heat exchange conduit to thereby transfer heat to the cleaning solution in the beverage conduit to heat the cleaning solution to a temperature sufficient for cleaning the beverage conduit of contaminants.

BRIEF DESCRIPTION OF THE DRAWINGS

Embodiments of the present invention will now be described by way of non-limiting example only, with reference to the accompanying drawings, in which:

FIG. 7(*b*) is the same diagram as FIG. 7(*a*) but illustrating the beverage and cleaning system operating in a cleaning mode.

DETAILED DESCRIPTION

Beverage Cooling System

Figure 1:
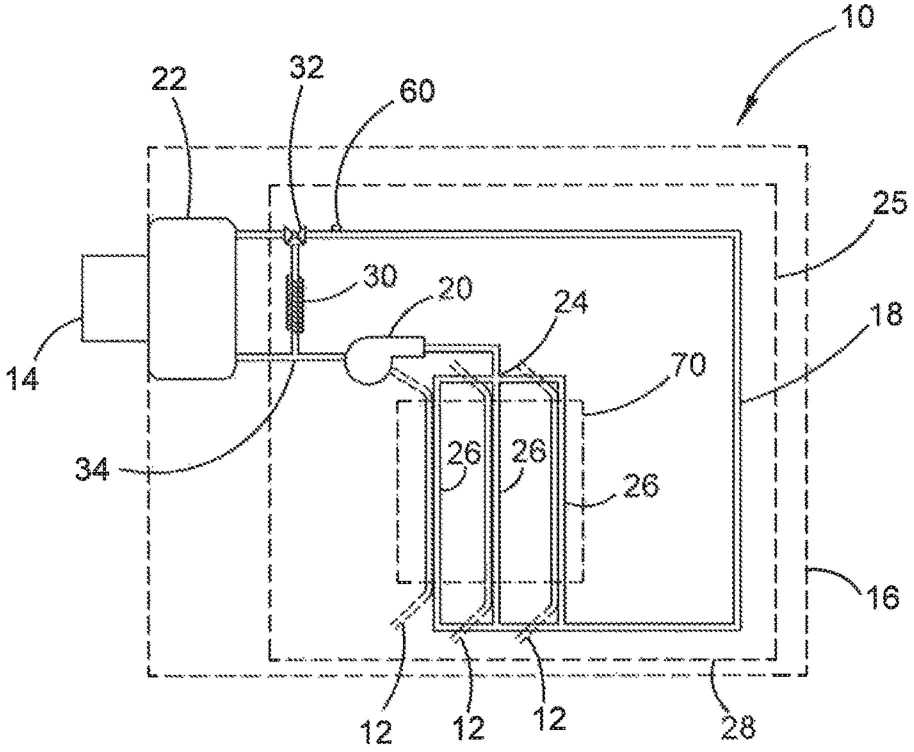
FIG. 1 is a schematic view of a beverage cooling system.
Figure 6:
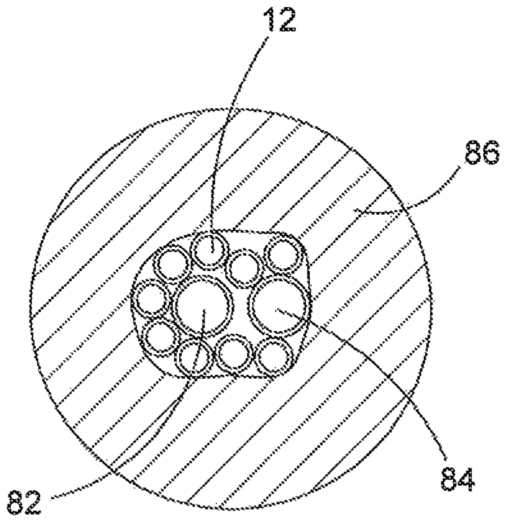
FIG. 6 is a cross-sectional view of a number of beverage conduits surrounding a heat exchange conduit.

A beverage cooling system 10, as shown in FIG. 1, is used for cooling a beverage contained in one or more beverage conduits 12 (see also FIG. 6). The beverage cooling system 10 includes a primary beverage cooling circuit 14 (see FIGS. 2, and 7(*a*)) for cooling fluid 15 contained in a secondary beverage cooling circuit 16. The secondary beverage cooling circuit 16 includes a heat exchange conduit 1 positioned to transfer heat from and/or to the beverage conduits 12, thereby to cool and/or heat the beverage. The secondary beverage cooling circuit 16 also includes a pump 20, to pump or circulate the fluid 15 around the secondary beverage cooling circuit 16, which is a closed circuit, and a reservoir or tank 22 for containing a volume or body of fluid 15.

While the pump 20 may be a single speed pump, the pump 20 in another embodiment is a variable speed pump enabling it to operate at an appropriate speed depending on the demand (i.e. the amount or change in temperature of beverage passing through the beverage conduits 12). In some embodiments, the pump 20 is a two speed puma having adjustable minimum and maximum speed settings.

Though in some embodiments the secondary beverage cooling circuit 16 may continually circulate the entire volume of fluid 15 contained therein, in the beverage cooling system 10 shown in FIG. 1 the secondary beverage cooling circuit 16 includes a reservoir or tank 22. The primary beverage cooling circuit 14 is positioned to transfer heat from the fluid 15 in the tank 22 thereby cooling the fluid 15 before it is pumped from the tank 22, by the pump 20, through the heat exchange conduit 18 and back to the tank 22.

A reservoir or tank 22 is advantageous as it maintains a large proportion of the fluid 15 in one position, which can then be pumped from the tank 22 when required. Moreover, the fluid 15 can be cooled in the tank 22 and effectively insulated from absorbing heat from the surrounding atmosphere, whereas insulating the fluid 15 in the heat exchange conduit 18 can be more difficult since it is moving and the heat exchange conduit 18 is positioned relative to the beverage conduits 12 so as to extract heat therefrom.

Figure 2:
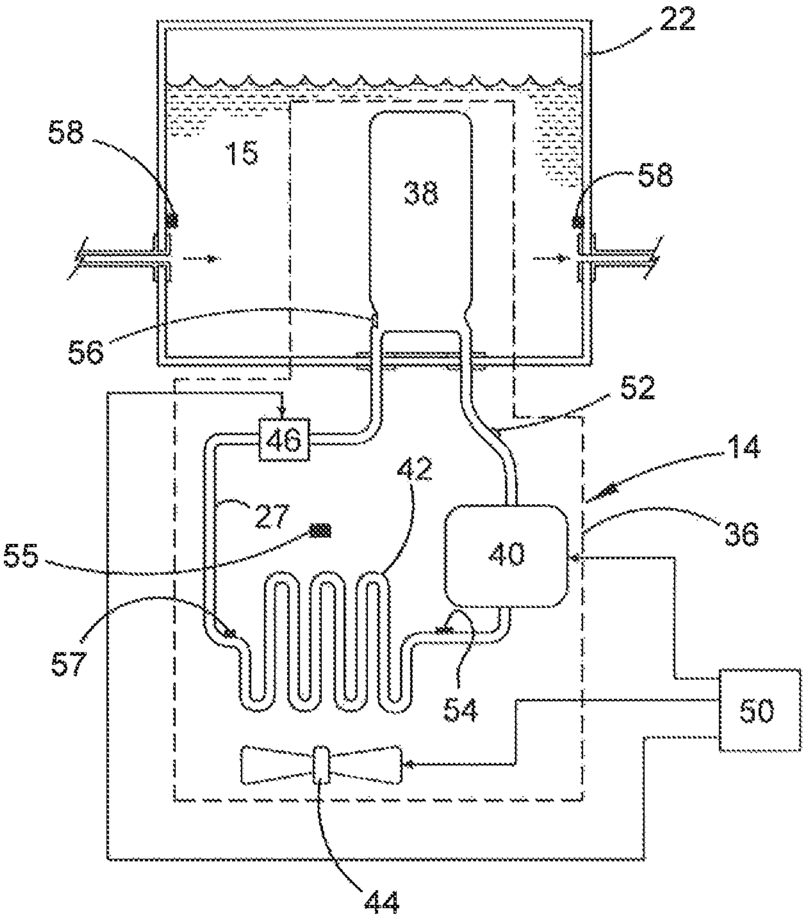
FIG. 2 is a schematic view of a primary beverage cooling circuit for use in the beverage cooling system of FIG. 1.
Figure 7A:
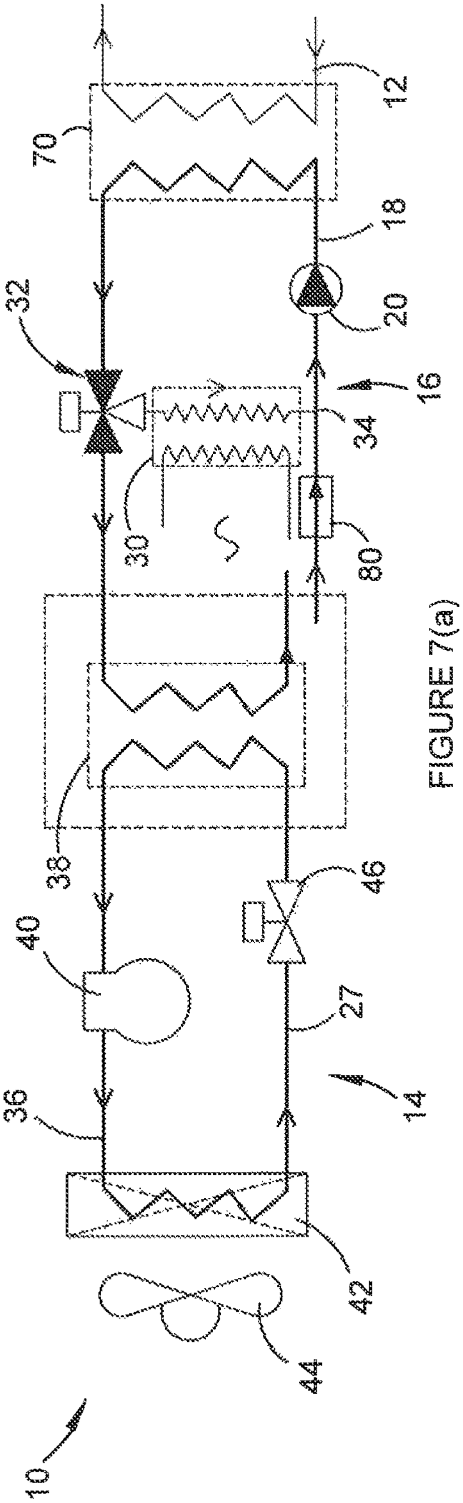
FIG. 7(*a*) is a schematic diagram illustrating a beverage cooling and cleaning system operating in a cooling mode.
Figure 7B:
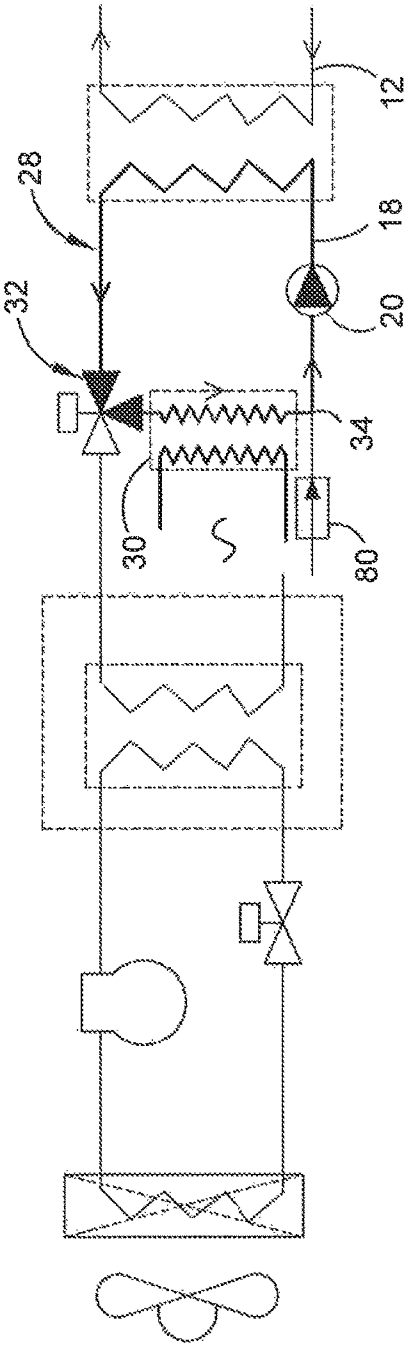

The primary beverage cooling circuit 14 as shown in FIGS. 2 and 7(*a*) refrigerates fluid 15 used in the secondary beverage cooling circuit 16. The primary beverage cooling circuit 14 comprises a refrigerant circuit 36 containing a refrigerant circulating through a heat exchanger 38, in heat transfer communication with the fluid 15 to cool the fluid 15, a variable displacement compressor 40, for circulating the refrigerant through the refrigerant circuit 36 by pressurizing the fluid, a cooling device in the form of a condenser 42 for condensing the refrigerant and including a variable speed condenser fan 44 for cooling the refrigerant, and a valve 46, for controlling the volume of refrigerant into the heat exchanger 38.

The valve in this embodiment is an electronic expansion valve. The cooling device is shown as a condenser having a variable speed fan for air cooling, but the primary beverage cooling circuit may instead employ water cooling to cool the refrigerant.

The compressor 40, condenser 43 and condenser fan 44 (with or without expansion valve 46) together with a refrigerant conduit 27 through which the refrigerant circulates in a closed loop, will hereinafter be collectively referred to as the refrigerant assembly.

While the heat exchanger 38 of the primary beverage cooling circuit 14 can be positioned anywhere where heat transfer from the fluid 15 to the refrigerant can be achieved, it will generally be desirable to position the heat exchanger 38 in the tank 22 of the secondary beverage cooling circuit 16

The primary beverage cooling circuit 14 also comprises a controller 50 for controlling the operation of the compressor, the cooling device and/or the valve based on one or more measurements from temperature and/or pressure sensors in the refrigerant circuit to control the beverage cooling system to operate on an efficient basis.

Accordingly, the system can reach a steady state operation that only uses the amount of energy required to reach the steady state. The result is an increase in system efficiency, estimated to be up to 30%, and a reduction in power requirements which, aside from reducing the system's carbon consumption, has other flow on effects. In particular, a greater system efficiency does not require the larger sized components that draw more power and demand 3-phase electric power systems. Rather, the electrical components of the present beverage cooling system (including the refrigerant assembly and also the pump 20) are of a size that can be connected directly to single phase power source.

For example, to achieve the cooling capacity required of a beverage cooling system operating at greater than 4.5 kW, electrical devices drawing three phase power are typically required. Single phase electrical devices are only rated up to about 4.5 kW, thus any power requirements rated over this value will need 3-phase power. Because of the increase of efficiency in the present system, power requirements are lower thereby allowing single phase power to be used.

The present beverage cooling system also allows versatility in its assembly. Traditional tanks are stored in a coolroom so that any heat drawn from the atmosphere surrounding the tank into the fluid contained in the tank is already colder than room temperature. Thus the heat exchanger need not work overly hard to maintain the desired temperature of the fluid. However, such a tank and the conduits connected thereto take up space in the coolroom and thereby reduce the number of other items (e.g. kegs) that can be stored therein.

Moreover, since the condenser fluidly connected to the heat exchanger gives off heat, it would traditionally have been positioned outside the coolroom. Traditional systems are thus "split systems".

In the present beverage cooling system the entire refrigerant assembly can be located indoors or outdoors (ego in a bar area) and may be split or located together. This is possible because the system operates efficiently to maintain fluid in the secondary cooling circuit in a steady cooled state.

The tank 22 containing the heat transfer fluid is insulated to minimize evaporation and heating of the fluid. As described herein and as shown in cross-section in FIG. 3 the tank 22 is insulated with a vacuum insulation panel 62, a known product formed by encapsulation and evacuation of open cell materials or fibre products. Alternatively, foam insulation could be used. The insulation 62 forms part of a body 64, housing the internal volume of the tank 22 that contains the fluid 15, and a lid 66 for substantially hermetically sealing the internal volume of the body 64.

The hermetic seal is significant as it substantially prevents ingress of air containing moisture which, over time, dilutes the concentration of the coolant (e.g. glycol) in the fluid 15.

The tank 22 and refrigerant circuit components are provided within a housing 68 which may or may not entirely enclose the tank 22 and refrigerant assembly.

Figure 3:
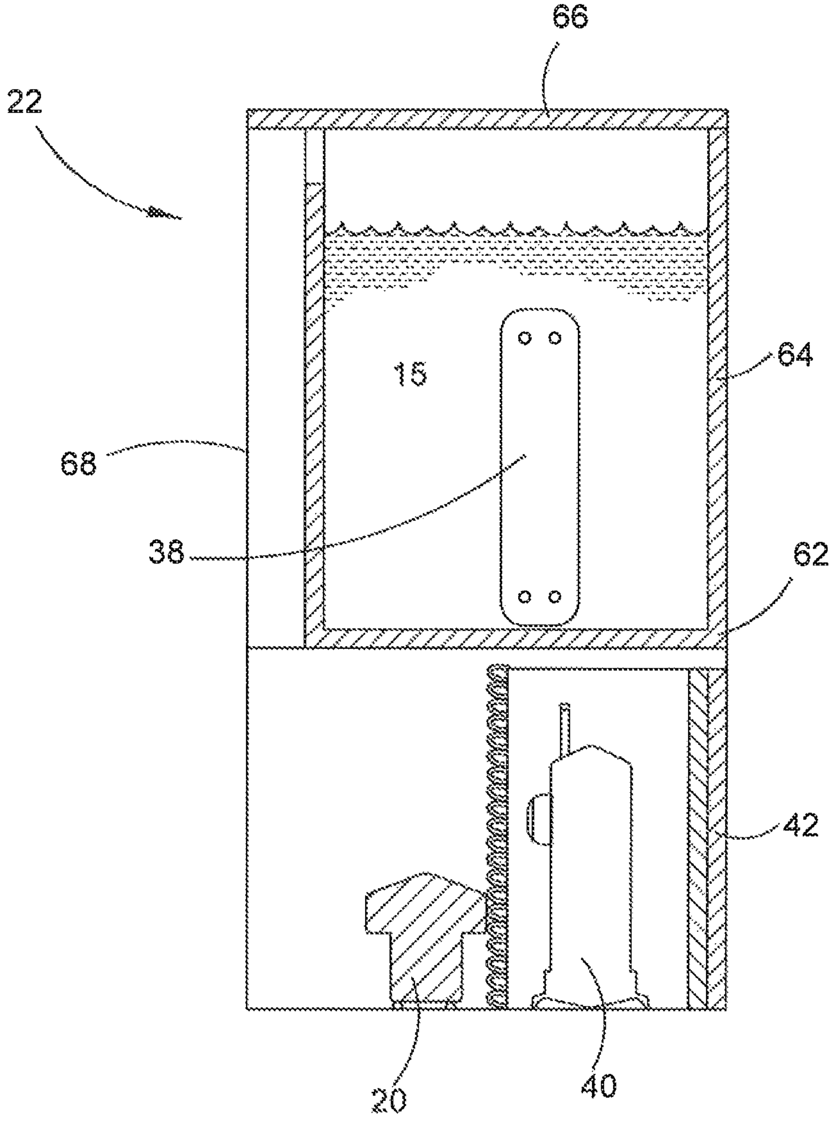
FIG. 3 is a cross-sectional view of the primary beverage cooling circuit of FIG. 2 in a housing.

As shown in FIG. 3, within the body 64 is the heat exchanger 38, and beneath the body 64 are the variable speed compressor 40, variable speed pump 20 and condenser assembly 42, presently being a typical coil condenser though any appropriate condenser may be used. The condenser assembly 42 (including the variable speed fan 44), or the entire refrigerant assembly, may instead be distanced from the tank 22 or be positioned at another point adjacent thereto, but positioning the condenser 42 beneath the tank 22 is generally preferably as a space saving measure.

The insulation 62 extends between the refrigerant assembly and the body 64 thereby to insulate the body 64 from heat from the condenser 42. Due to the nature of vacuum insulated panels 62, substantially no heat is transferred from the refrigerant assembly to the fluid 15.

By insulating the body 64 in this manner the fluid 15 is thereby also insulated from the atmosphere, and thus the housing 68 (including tank 22 and refrigerant circuit components) can be positioned outside of a coolroom. This frees up space within the coolroom.

In addition, there is no need to extend refrigerant conduits over long distances between the refrigerant assembly and tank of a split system which requires additional plumbing & installation costs. Instead the refrigerant need only cover a short distance between the refrigerant assembly and the neighbouring heat exchanger 38.

In many applications of the beverage cooling system 10, the beverage in the beverage conduits 12 will be dispensed at a bar or other establishment where liquor is served.

As such, the heat exchange conduit 18 will be positioned substantially coextensively with the beverage conduits 12 up to a serving area (not shown). Once the fluid 15 has extracted heat from the beverage it returns from the serving area to be cooled by the primary beverage cooling system 14.

The secondary beverage cooling circuit 16 of the embodiment illustrated also includes a tertiary heat exchanger 70 to further cool the beverage in the beverage conduit 12. In one embodiment the tertiary heat exchanger 70 includes one or more chilling plates that chill the beverage at a final stage before reaching a tap. The chilling plate is a form of heat exchange apparatus that increases the heat transfer surface area of the beverage by running it through helical, serpentine or other type channels in the chilling plate and either running the cooling fluid 15 in similar channels alongside, or flooding the plate via passages with the cooling fluid. The fluid 15 returns through the secondary cooling circuit 16 to the tank 22 while the fully cooled beverage can then be dispensed through suitable taps.

The tertiary heat exchange system 70 may therefore be positioned in or near the serving area. In particular, the tertiary heat exchange system 70 can be positioned underneath or behind a serving area such as a bar.

Alternatively or additionally, the system may include a trifurcation 24 that splits the heat exchange conduit 18 into three separate heat exchange lines 26 for transferring heat to/from respective beverage conduits 12. This enables one beverage cooling system 10 to simultaneously cool more than one beverage running in separate and distinct beverage lines or conduits 12, or to cool multiple beverage lines 12 dedicated to dispensing the same beverage.

Figure 4:
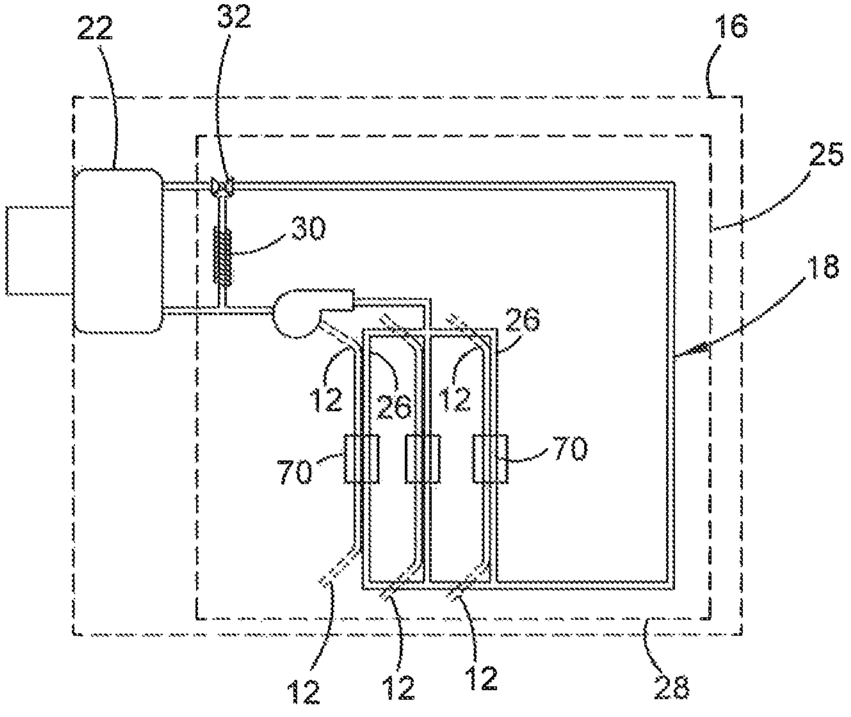
FIG. 4 is a schematic view of a beverage conduit cleaning system combined with a secondary beverage cooling circuit.

FIG. 1 illustrates a single tertiary heat exchanger 70 through which beverage in beverage conduits 12 are cooled through the heat exchanger by way of the fluid carried by heat exchange lines 26. More than one tertiary heat exchanger can be used. FIG. 4 illustrates the three branches of beverage conduit lines 12/heat exchange lines 26 each associated with a chilling plate 70 to cool the beverage to the desired temperature.

An example of the heat exchange lines and beverage lines 12 is shown in FIG. 6 in cross-section. A glycol-cooled beer line is referred to herein in which the heat exchange conduit 18 extends both up and back along the beverage conduits 12. The heat exchange conduit 18 includes a forward pass portion 82, which generally extends towards the serving area alongside the beverage conduits 12 to extract heat therefrom, and a return pass 84 extending in the opposite direction to the forward pass 82 and extracting further heat from the beverage conduits 12. The collection of conduits 12, 82, 84 is housed in a sleeve 86 of insulation to prevent the beverage absorbing heat from the atmosphere.

As an example, the temperature of the fluid in the forward pass 82 could be −2° in order to cool beverage to 0-2° (when measured after passing through the tertiary heat exchanger) while the return pass fluid temperature will have raised to about 0° on the return pass. The forward and return passes 82, 84 of the heat exchange conduit 18 are positioned in the sleeve 86 to maximise cooling and readily extract heat from the beverage. As fluid in the return pass will still be cooler than the beverage fluid, the heat exchange conduits 18 may be positioned centrally in the sleeve 86 surrounded by the beverage conduits, or in the reverse order with heat exchange conduits positioned at the extreme ends of the sleeve 86.

In this regard, with reference to FIGS. 1 and 6, the beverage cooling system 10 includes the primary beverage cooling circuit 14 and the secondary beverage cooling circuit 16 containing fluid 15 that cools beverage in beverage conduits 12. While the embodiment shown in FIG. 1 includes three such beverage conduits 12, it will be appreciated that the beverage cooling system 10 may be adapted to suit any number of beverage conduits 12 (i.e. one or more) depending on tap dispensing requirements by increasing or reducing the number of heat exchange lines 26 in the heat exchange conduit 18. As demonstrated by the embodiment shown in FIG. 6, the number of beverage conduits 12 and heat exchange conduits 18 (or heat exchange lines 26) need not be one-to-one, but may instead be any appropriate number of either as sufficient to achieve the desired purpose of the beverage cooling system 10.

As discussed above, the primary beverage cooling circuit 14 comprises a refrigerant circuit 36 containing a refrigerant circulating through a heat exchanger 38, in heat transfer communication with the fluid 15 to cool the fluid 15, a variable displacement compressor 40 for circulating the refrigerant, a cooling device in the form of a condenser 42 including a variable speed condenser fan 44 for cooling/condensing the refrigerant and, an electronic expansion valve 46, for controlling the volume of refrigerant into the heat exchanger 38.

As mentioned above, the primary beverage cooling circuit 14 further comprises a controller 50 for controlling the operation of the refrigerant circuit components. The controller operates based on one or more measurements from temperature and/or pressure sensors 52, 54, 55, 56, 57 in the refrigerant circuit 36 to thereby operate the primary beverage cooling circuit 14 on an efficient basis. In general, for the controller 50 to effect control over the expansion valve 46, the expansion valve 46 will need to be an electronic expansion valve, though a manual expansion valve may be appropriately used where valve operation does not need to rely on the controller.

As with refrigerator systems in general, FIGS. 2 and 7(*a*) schematically show refrigerant flowing into the compressor 40 that pressurises the refrigerant and causes it to circulate within the closed loop of the refrigerant circuit. The pressurised refrigerant then passes through a condenser 42 that condenses the refrigerant and dissipates heat therefrom. The fan 44 blows air over the condenser 42 to dissipate the heat and thereby cool the refrigerant. The refrigerant then passes through the expansion valve 46 which dilates and contracts to control the amount of refrigerant metered to the heat exchanger 38. The refrigerant expands in the heat exchanger 38 (which cause evaporation from liquid phase to gaseous phase) and draws heat from the surrounds into the refrigerant, in the present case from the fluid 15 through the walls of the heat exchanger 38, thereby cooling the fluid 15. The super heated refrigerant passes from the heat exchanger 38 into the compressor 40, and once again exits the compressor 40 as super heated refrigerant the heat of which is to be dissipated in the condenser 42.

Rather than having single state components (e.g. single speed condenser fan, fully open/closed valve, and constant displacement compressor), one or more of the compressor 40, condenser fan 44 and expansion valve 46 can have variable states. As such, and depending on how much of the componentry has a variable state, the displacement of the compressor 40, the speed of the fan 44 and the flow rate through the valve 46 can all be adjusted to optimise the system load.

To facilitate energy efficient operation of the primary beverage cooling circuit 14, reduced power usage and to maintain low component wear rates, the controller 50 controls one or more of the refrigerant circuit components to maintain a temperature of the fluid 15 and/or refrigerant about a first set-point temperature. To achieve this, the controller 50 uses measurements taken from one or more sensors 52, 54, 55, 56, 57, to determine the temperature of the fluid 15 in the tank 22, and/or the pressure and/or temperature of the refrigerant at various positions around the refrigerant circuit 36 to assess how control over the refrigerant circuit components should be effected.

Examples of suitable placements of temperature sensors in the beverage cooling system include any one or more of the following: in the tank 22 containing the cooling fluid (sensor 56) (at supply and/or return (sensor 58)), between the heat exchanger 38 and the compressor 40 (sensor 52); at the condenser 42 to measure ambient temperature (sensor 55); or between the condenser 42 and the expansion valve 46 (sensor 57).

Examples of suitable placements of pressure sensors in the beverage cooling system include any one or more of the following: in the tank 22 containing the cooling fluid; between the heat exchanger 38 and the compressor 40 (sensor 52); between the compressor 40 and the condenser 42 (sensor 54); or between the condenser 42 and the expansion valve 46 (sensor 57).

The controller 50 may also control one or more of the refrigerant circuit components to maintain the temperature of the refrigerant and/or fluid 15 within a predetermined temperature range about the first set-point temperature. Thus the controller 50 need not constantly adjust control parameters (e.g. operating speed or displacement) for the refrigerant circuit components 36.

Depending on the type of beverage being dispensed through the beverage conduits 12, and the desires of the consumer, the controller 50 may be programmed to control the temperature of the fluid 15 and/or refrigerant to within, for example, ±2° C. or ±1° C. of the first set-point temperature.

It will be appreciated that other temperature ranges may be suitable for particular circumstances and those temperature ranges may not be uniformly distributed about the first set-point temperature. For example, it may be desirable for the fluid 15 to have an ideal temperature (i.e. first set-point temperature) of −2° C., but from −4° C. to −1° C. is a tolerable temperature range.

It will also be appreciated that instead of, or in addition to, controlling one or more of the refrigerant circuit components the controller 50 may control the speed of the variable speed pump 20 to maintain a temperature of the fluid 15 and/or beverage about a second set-point temperature that may/may not be different to the first set-point temperature, and may/may not have similar temperature range parameters as discussed above.

The controller 50 may also be programmed to periodically (e.g. after a set time interval) adjust control of the refrigerant circuit components. This may occur, for example, where the controller 50 is using historical data or a series of measurements from the sensors 52, 54, 55, 56, 57, 58 to trend the temperature and/or pressure changes in the fluid 15 and/or refrigerant and thereby control the refrigerant circuit components. Such an approach assists with ironing out minor temperature fluctuations and, ideally, will lead to substantially steady-state operation of the refrigerant circuit components.

In this regard, the controller may be programmed to control operation of the compressor, condenser fan and expansion valve:

(i) based on a single measurement from the sensors;

(ii) by adjusting control of the compressor, condenser fan and expansion valve at the end of consecutive time intervals;

(iii) by trending historical measurement data and effecting control to trend towards substantially steady-state operation of the compressor, condenser fan and/or expansion valve; or (iv) by another method as appropriate.

As mentioned under item (i) above, the controller 50 may control the refrigerant circuit components based on a single (e.g. the most recent) measurement from the sensors 52, 54, 55, 56, 57, 58 as soon as that measurement is taken. However, this would lead to regular changes in operational state (e.g. speed, displacement), and thereby increase the wear rate, of the refrigerant circuit components.

As discussed above, the controller 50 controls the refrigerant circuit components using one or more measurements from temperature and/or pressure sensors 52, 54, 55, 56, 58. In the primary beverage cooling circuit 14, sensor 52 is positioned to measure the temperature and/or pressure (or two sensors may be provided to measure both temperature and pressure) of the superheated refrigerant at the heat exchanger 38 or the compressor 40, or at a point therebetween. A further sensor 54 is positioned to measure the pressure of the compressed refrigerant at the compressor 40 or the condenser 42, or a point therebetween. Another sensor 56 is positioned to measure the temperature of the cooling fluid 15 in the tank 22.

Some of the more significant advantages with the presently described beverage cooling system are that there is an increase in system efficiency, and therefore a decrease in running costs, but also the system's electrical components can be directly connected to single phase power while still operating at a capacity of greater than approximately 4.5 kW of power. This is particularly significant to users where 3-phase power may not be readily available.

Beverage Conduit Cleaning System

Figure 5:
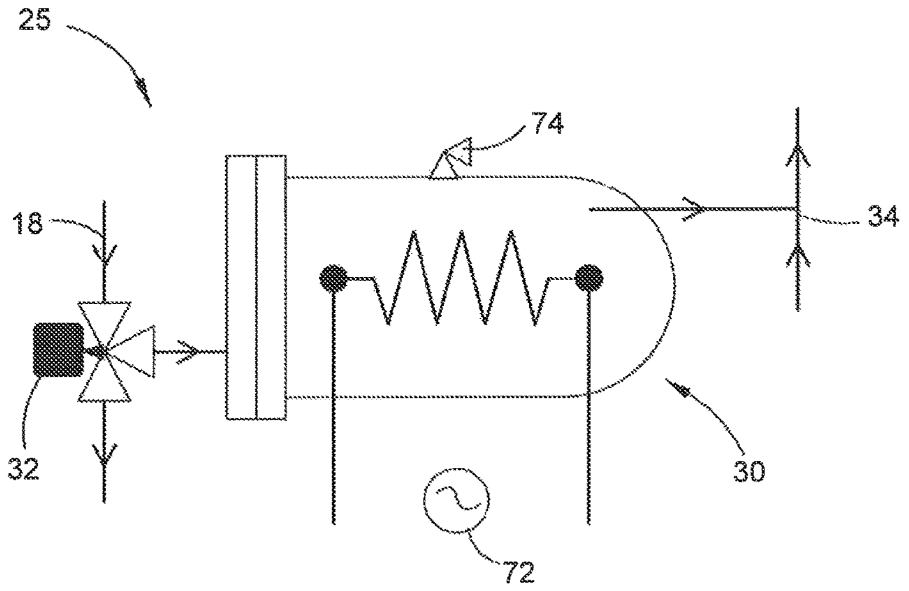
FIG. 5 is a schematic view of a beverage conduit cleaning system.

As noted above, the primary function of the secondary beverage cooling circuit 16 is to cool a beverage in one or more beverage conduits, beer lines or similar, 12. The secondary beverage cooling circuit 16 shown in FIGS. 1 and 7(*a*) also functions as part of a beverage conduit cleaning system 25. The cleaning system is illustrated in FIGS. 5 and 7(*b*). Rather than transferring heat (i.e. cooling) from the beverage conduits 12, the beverage conduit cleaning system 25 serves to transfer heat to (i.e. heating) the beverage conduits 12.

The beverage conduit cleaning system 25 includes a heating circuit 28 comprising the heat exchange conduit 18 and beverage conduits 12 discussed above but for the purposes of cleaning are filled with a cleaning solution rather than beverage. The heat exchange conduit is located at near or adjacent the beverage conduits to enable heat transfer therebetween, in addition to the heat exchange occurring at the chilling plate heat exchanger 70.

The heating circuit 28 includes a heat exchanger 30 to heat the fluid 15 in the heat exchange conduit 18 to thereby enable transferral of heat to the cleaning solution in the beverage conduits 12. As with cooling a beverage in the beverage conduits 12, the heating circuit 28 also incorporates the pump 20 to pump the heated fluid 15 through the heat exchange conduit 18.

This system allows the cleaning solution to be heated faster, and/or to a higher temperature, than might otherwise be achieved by simply allowing the temperature of the cleaning solution to increase with interference (i.e. by turning off the primary cooling system 14 and allowing the beverage to absorb heat from the surrounding atmosphere).

Heating the cleaning solution in the beverage conduits 12 by way of the cleaning system 25 enables detergents and the like to function more effectively. This reduces the likelihood of a biofilm developing on the insides on the beverage conduits 12, which biofilm might otherwise cause replacement of the beverage conduits 12 and/or further downtime for cleaning before the secondary cooling circuit 16 can once again be caused to cool the fluid 15 in the heat exchange conduit 18. In one example of effective cleaning, the cleaning solution could be heated to 30° C. for 120 minutes.

FIGS. 7(*a*) and 7(*b*) illustrate the same beverage distribution system operating as both a cooling system (FIG. 7(*a*)) and a cleaning system (FIG. 7(*b*)). To enable the secondary beverage cooling circuit 16 and heating circuit 28 to use a common heat exchange conduit 18, the fluid 15 must be able to bypass the heat exchanger 30 so that it can be cooled by the primary beverage cooling circuit 14. Thus, in a cooling mode the secondary beverage cooling system 16 can be used to cool the fluid 15 and thereby cool the beverage in the beverage conduits 12 and, conversely, in a heating mode the heating circuit 28 can be used to heat the fluid 15 and thereby heat the cleaning solution in the beverage conduits 12.

In the present embodiment, bypassing of the heat exchanger 30 is effected by a three-way valve 32. The valve 32 operates to substantially isolate either the tank 22 or heat exchanger 30 from fluid 15 flowing through the heat exchange conduit 18.

It will be appreciated that a further valve 80 might be installed at or before junction 34 of FIGS. 1, 7(*a*) and 7(*b*). That valve could be a non-return valve or a solenoid, although a valve is not necessary as the pump should prevent back flow of fluid. Furthermore, as the heat exchanger 30 will generally be switched off when not in use, and since fluid 15 may only 'mix' in the conduit near the heat exchanger 30 rather than 'flow' therethrough due to the orientation of the valve 32, there will generally be no need to install such a further valve.

Importantly, where existing beverage cooling systems 10 are concerned, it may be impractical or not cost-effective to incorporate a beverage conduit cleaning system 25 thereinto. In such circumstances, the beverage conduit cleaning system 25 may be a standalone system that is retrospectively augmented into the existing system. Such a system 25 is shown in FIG. 5.

Retrospectively fitted cleaning system 25 short-circuits the heat exchange conduit 18 across the tank 22 and so by-passes tank 22. As shown in FIG. 5, cleaning system 25 includes the three way solenoid valve 32 in the return line of heat exchange conduit 18 that re-directs fluid 15 through heat exchanger 30 wherein the fluid 15 is heated. Heat exchanger 30 includes a power source 72 and a pressure relief valve 74.

Once heated, fluid 15 exits the heat exchanger 30 and re-joins the heat exchange conduit 18 at junction 34 on the supply side of the tank 22 to be pumped by pump 20 through the heat exchange conduit 18 and through tertiary heat exchanger 70. In doing so, the heated fluid heats the cleaning solution that has replaced the beverage in the beverage conduit 12 for the purpose of cleaning. As explained above, heating the cleaning solution ensures the surfactants, and other solvents, in the detergent act effectively to remove grit, biofilm and other deposits.

To facilitate control of pump 20 for pumping fluid around the secondary beverage cooling circuit 16 and beverage conduit cleaning system 25, a temperature sensor 58 is positioned to measure a temperature of the fluid 15 in the tank 22 (at the outlet of the tank 22, though any other position may be used as appropriate). A further temperature sensor 60 is positioned at or upstream (relative to the direction of flow of the fluid 15) of the three-way valve 32 to determine the temperature of the fluid 15 prior to being either cooled by the primary beverage cooling circuit 14 or heated by a heater 30.

Alternatively, or in addition, to the above sensors 52, 54, 55, 56, 57, 58, the beverage cooling system 10 may be provided with a sensor (not shown) to measure one or both of an inlet temperature and an outlet temperature at a point respectively before and after the fluid is cooled by the primary beverage cooling circuit 14.

It will be understood that many of other sensors may be used as appropriate to measure properties of the refrigerant at any desired point so as to affect accurate control of the beverage cooling system 10. Moreover, where the pump 20 is a variable speed pump, the controller 50 can be used to control the pump 20 in the same manner as control over the refrigerant circuit components is affected. In an embodiment, the pump 20 is driven by a variable speed drive and the controller 50 controls the speed of the variable speed drive depending on the difference between a temperature sensed at or just upstream of the tank 22 and a temperature sensed at or just downstream of the tank 22.

The refrigerant used in the refrigerant circuit 36 will preferably be an R410-A refrigerant, which has environmental benefits over other refrigerants in use, or more recently developed alternative. However, any appropriate refrigerant may be used as desired.

Preferably, the fluid 15 includes glycol or another anti-freezing agent. The glycol is ideally mixed with water at a ratio of 1:1, 1:2, 1:3, (1:4), 2:3, 7:13 or any other appropriate ratio.

The beverage cooling system 10 has been shown as including a heat exchanger 30 that joins the secondary beverage cooling circuit 16 to form part of a heating circuit 28 of a beverage conduit cleaning system 25. However, in particular embodiments, there will not be any such heating circuit 28. Such embodiments may be achieved by removing the heat exchanger 30, three-way valve 32 and the portion of conduit neighbouring the heat exchanger 30 and extending between the three-way valve 32 and junction 34. Thus, the beverage cooling system 10 will simply include a primary beverage cooling circuit 14 and secondary beverage cooling circuit 16 as herein described.

Whether or not the beverage cooling system 10 also serves as part of a beverage conduit cleaning system 25, the former can be switched off and the latter switched on to enable effective cleaning of the beverage conduits 12. This switching may effected by the controller 50, the controller 50 being programmed to enter a "cleaning mode" or "cleaning cycle" at a particular time during, for example, a week (e.g. when there are no patrons in a liquor serving establishment).

Alternatively, the switching process may be performed manually by toggling a switch. Advantageously, the switch may be positioned underneath a bar or serving area so that staff members can activate either a "cleaning mode" or "cooling mode" remotely from the beverage cooling system 10 and/or beverage conduit cleaning system 25. In some embodiments, a 3-position switch is used so that the "cleaning mode" and "cooling mode" can be selected, or the system 10 can be switched off altogether.

The "cooling mode" is a mode in which the beverage conduit cleaning system 25 is switched off and the beverage cooling system 10 is switched on. In the cooling mode the fluid 15 bypasses the heat exchanger 30 to be cooled by a primary beverage cooling circuit 14.

In contrast, the "cleaning mode" is a mode in which the beverage conduit cleaning system 25 is switched on and the beverage cooling system 10 is switched off. Thus in the cleaning mode the fluid 15 bypasses the tank 22 to be heated by the heat exchanger 30.

As an example of toggling or otherwise effecting switching between a cooling mode and a cleaning mode, when the beverage cooling system 10 also serves as part of a beverage conduit cleaning system 25, switching to a cleaning mode causes:

(i) three-way valve 32 to isolate the tank 22 from the heat exchange conduit 18 and to join the heat exchanger 30 to the heat exchange conduit 18 (i.e. bypassing the tank 22);

(ii) the heat exchanger 30 to switch on;

During heating the tank 22 may be switched off as it is well insulated and the amount of energy loss by the volume of fluid 15 in the tank 22 increasing in temperature is small.

When switching to a cooling mode:

(i) three-way valve 32 joins the tank 22 to the heat exchange conduit 18 and isolates the heater 30 from the heat exchange conduit 18 (i.e. bypassing the heater 30);

(ii) the heater is itched off;

As discussed above, the beverage conduit cleaning system 25 can be retrospectively combined with an existing beverage cooling system 10.

While a single controller 50 has been described as being capable of controlling all of the controllable components (i.e. controlling the displacement of the compressor 40, the speed of the condenser fan 44, the dilation/expansion and contraction of the expansion valve 46 and the speed of the variable speed pump 20), it will be appreciated that one or more controllers 50 may be used. In particular, a single controller may be used to control a single controllable component and/or each controllable component may be provided with a separate/dedicated controller. Furthermore, it is conceivable that the controller be remotely controlled by way of remote connection.

The controller may also provide further features, such as:

an information display displaying alerts or commands such as "Beer System Cleaning Required" identifying to staff that the beverage lines should be cleaned (may be set to be periodical, e.g. every 24 hrs or 7 days).

cycle adjustment time (e.g. time allowed for cleaning cycle to take place).

HIGH/LOW pressure and temperature alerts, equipment and system fault alarms,

Auto-cycle conditions in response to conditions of the beverage cooling system 10 (e.g. in cases of low pressure in the heat exchange conduit 18, but high compressor workload, the controller 50 may shut off the beverage cooling system 10 and display a message to "CHECK FOR LEAKS").

It will be understood to persons skilled in the art of the invention that many modifications may be made without departing from the spirit and scope of the invention.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A primary beverage cooling circuit for refrigerating a fluid used in a secondary beverage cooling circuit that cools beverage in a beverage conduit by pumping the fluid through a heat exchange conduit adjacent the beverage conduit to transfer heat therebetween, the primary beverage cooling circuit comprising:

a refrigerant circuit containing a refrigerant circulating through:

a heat exchanger in continuous direct heat transfer communication with the fluid to cool the fluid during operation of the primary beverage circuit to refrigerate the fluid, wherein the heat exchanger is located in a tank containing a volume of the fluid;

a variable displacement compressor for circulating the refrigerant through the refrigerant circuit;

a cooling device for cooling the refrigerant; and a valve for controlling the volume of the refrigerant into the heat exchanger;

the primary beverage cooling circuit further comprising a controller for controlling the operation of the compressor and/or the cooling device and/or the valve based on one or more measurements from temperature and/or pressure sensors in the refrigerant circuit to maintain a temperature of the fluid and/or the refrigerant about a set-point temperature.

2. A primary beverage cooling circuit according to claim 1, wherein the cooling device is a condenser including a variable speed fan.

3. A primary beverage cooling circuit according to claim 2, wherein the variable speed fan is controlled by the controller.

4. A primary beverage cooling circuit according to claim 1, wherein the temperature is maintained within a temperature range of between ±1° C. of the set-point temperature.

5. A primary beverage cooling circuit according to claim 4, wherein the set-point temperature of the fluid is approximately −2.5° C.

6. A primary beverage cooling circuit according to claim 2, wherein the controller is configured to control operation of the compressor, variable speed fan and valve by:

basing controller operation on a single measurement from the sensors; or adjusting control of the compressor, variable speed fan and valve at the end of consecutive time intervals; or trending historical measurement data and affecting control to trend towards substantially steady-state operation of the compressor, variable speed fan and/or valve.

7. A primacy beverage cooling circuit according to claim 1, including a temperature sensor positioned at any one or more of the following: in the tank containing the volume of the fluid, between the heat exchanger and the compressor; at the cooling device; or between the cooling device and the valve.

8. A primary beverage cooling circuit according to claim 1, including a pressure sensor positioned at any one or more of the following: between the heat exchanger and the compressor; between the compressor and the cooling device; or between the cooling device and the valve.

9. A primary beverage cooling circuit according to claim 1, wherein the controller is configured to control the compressor and/or cooling device and/or valve using a most recent measurement from the temperature and/or pressure sensors or using a series of measurements from the temperature and/or pressure sensors, to achieve substantially steady-state operation.

10. A primary beverage cooling circuit according to claim 1, wherein the valve is an expansion valve, that operates either electronically or mechanically.

11. A primary beverage cooling circuit according to claim 1, wherein the refrigerant is an R-410A refrigerant.

12. A primary beverage cooling circuit according to claim 1, wherein the fluid includes glycol.

13. A primary beverage cooling circuit according to claim 1, wherein the primary beverage cooling circuit operates at a capacity of greater than approximately 4.5 kW and draws power directly from a single phase power source.

14. A beverage cooling system comprising the primary beverage cooling circuit claimed in claim 1 and a secondary beverage cooling circuit containing fluid that cools beverage in a beverage conduit, the secondary cooling circuit comprising a heat exchange conduit positioned to transfer heat from the beverage conduit and a pump to pump the fluid through the heat exchange conduit, wherein the secondary cooling circuit is positioned in heat exchange with the primary cooling circuit for cooling the fluid.

15. A beverage cooling system according to claim 14, wherein the pump is a variable speed pump for pumping the fluid through the heat exchange conduit.

16. A beverage cooling system according to claim 15, wherein the controller is configured to control operation of the variable speed pump in response to one or more measurements from temperature and/or pressure sensors in the primary and/or secondary beverage cooling circuits to thereby operate the system on an efficient basis.

17. A beverage cooling system according to claim 15, wherein the controller is configured to control the variable speed pump to maintain a temperature of the fluid within a predetermined temperature range about a set-point temperature.

18. A beverage cooling system according to claim 17, wherein the temperature range is between ±1° C. of the set-point temperature and the set-point temperature is −2.5° C.

19. A beverage cooling system according to claim 14, wherein the secondary cooling circuit includes the tank for containing a volume of the fluid.

20. A beverage cooling system according to claim 19, wherein the tank is insulated and includes a lid that substantially hermetically seals the tank.

21. A beverage cooling system according to claim 20, wherein the tank is insulated by vacuum insulation panels.

22. A beverage cooling system according to claim 16, wherein the sensors include a sensor to measure one or both of an inlet temperature and an outlet temperature at a point respectively before and after the fluid is cooled by the primary beverage cooling circuit.

23. A beverage cooling system according to claim 14, wherein the secondary beverage cooling circuit includes a tertiary heat exchange system for further cooling the beverage.

24. A beverage cooling system according to claim 23, wherein fluid and beverage, respectively from the heat exchange conduit and beverage conduit, pass into the tertiary heat exchange system from where the fluid returns through the heat exchange conduit back to being cooled by the primary beverage cooling circuit.

25. A beverage cooling system according to claim 23, wherein the tertiary heat exchange system is a chilling plate.

* * * * *